US007508766B2

(12) United States Patent
Tateson et al.

(10) Patent No.: US 7,508,766 B2
(45) Date of Patent: Mar. 24, 2009

(54) PACKET ROUTING

(75) Inventors: Jane E Tateson, Woodbridge (GB); Ian W Marshall, Bredfield (GB)

(73) Assignee: British Telecommunications PLC, London (GB)

( * ) Notice: Subject to any disclaimer, the term of this patent is extended or adjusted under 35 U.S.C. 154(b) by 981 days.

(21) Appl. No.: 10/312,770

(22) PCT Filed: Jul. 5, 2001

(86) PCT No.: PCT/GB01/03012

§ 371 (c)(1),
(2), (4) Date: Dec. 30, 2002

(87) PCT Pub. No.: WO02/05495

PCT Pub. Date: Jan. 17, 2002

(65) Prior Publication Data

US 2003/0174654 A1 Sep. 18, 2003

(30) Foreign Application Priority Data

Jul. 6, 2000 (EP) .................................. 00305715

(51) Int. Cl.
*H04L 12/26* (2006.01)
*H04J 3/14* (2006.01)
*G08C 15/00* (2006.01)
*G06F 11/00* (2006.01)
*G01R 31/08* (2006.01)

(52) U.S. Cl. ........................ 370/238; 370/241; 370/252; 709/238

(58) Field of Classification Search ......... 370/230–254, 370/338–389, 400–469; 709/229–241
See application file for complete search history.

(56) References Cited

U.S. PATENT DOCUMENTS

| 4,974,224 A | | 11/1990 | Boone | |
|---|---|---|---|---|
| 5,253,161 A | * | 10/1993 | Nemirovsky et al. | ........ 709/241 |
| 5,471,467 A | * | 11/1995 | Johann | ....................... 370/238 |

(Continued)

FOREIGN PATENT DOCUMENTS

EP 0 858 189 A2 8/1998

(Continued)

OTHER PUBLICATIONS

Tannebaum, "Network Layer Design Issues", Computer Networks, Third Edition, International Edition 1996, Prentice Hall, pp. 345-355.

(Continued)

*Primary Examiner*—M. Phan
(74) *Attorney, Agent, or Firm*—Nixon & Vanderhye PC

(57) ABSTRACT

A routing protocol scatters a stream of packets along a number of parallel paths, the packets being treated independently. The next hop for each packet is chosen probabilistically by comparing the 'resistance' of available options. The resistance of a given hop depends upon the time the packet would spend in an output buffer from the current node, the time the packet would spend in the input buffer of the next hop node, the transfer time between the nodes and the number of hops that the packet would take from the current node to the ultimate destination of the packet using the shortest path. This routing protocol is more efficient that shortest path first routing under simulation.

13 Claims, 14 Drawing Sheets

U.S. PATENT DOCUMENTS

| | | | |
|---|---|---|---|
| 5,499,237 A * | 3/1996 | Richetta et al. | 370/400 |
| 5,539,815 A * | 7/1996 | Samba | 379/221.07 |
| 5,596,719 A * | 1/1997 | Ramakrishnan et al. | 709/241 |
| 5,675,582 A * | 10/1997 | Hummel et al. | 370/255 |
| 5,933,425 A * | 8/1999 | Iwata | 370/351 |
| 6,038,215 A * | 3/2000 | Uekumasu | 370/230 |
| 6,118,834 A * | 9/2000 | Rasanen | 375/372 |
| 6,144,641 A * | 11/2000 | Kaplan et al. | 370/238 |
| 6,147,990 A * | 11/2000 | Andrews et al. | 370/380 |
| 6,240,102 B1 * | 5/2001 | Asano | 370/468 |
| 6,347,078 B1 * | 2/2002 | Narvaez-Guarnieri et al. | 370/230 |
| 6,377,551 B1 * | 4/2002 | Luo et al. | 370/238 |
| 6,512,745 B1 * | 1/2003 | Abe et al. | 370/232 |
| 6,606,303 B1 * | 8/2003 | Hassel et al. | 370/238 |
| 6,724,722 B1 * | 4/2004 | Wang et al. | 370/229 |
| 6,735,178 B1 * | 5/2004 | Srivastava et al. | 370/252 |
| 6,751,219 B1 * | 6/2004 | Lipp et al. | 370/390 |
| 6,868,086 B1 * | 3/2005 | Putzolu et al. | 370/401 |
| 7,020,087 B2 * | 3/2006 | Steinberg et al. | 370/238 |
| 2001/0055275 A1 * | 12/2001 | Herrmann et al. | 370/230 |
| 2002/0024532 A1 * | 2/2002 | Fables et al. | 345/700 |
| 2003/0048307 A1 * | 3/2003 | Bryan et al. | 345/810 |
| 2003/0072306 A1 * | 4/2003 | Hunzinger | 370/389 |
| 2003/0109285 A1 * | 6/2003 | Reed et al. | 455/562 |
| 2005/0066052 A1 * | 3/2005 | Gupta et al. | 709/238 |

FOREIGN PATENT DOCUMENTS

| | | |
|---|---|---|
| EP | 0858189 A2 | 8/1998 |
| WO | WO 00/24164 | 4/2000 |

OTHER PUBLICATIONS

Detailed PCT Written Opinion dated Jul. 23, 2002.
Applicant's Responsive Argument dated Oct. 4, 2002.
Minutes of Telephone Conversation with the PCT/EPO Examiner dated Oct. 21, 2002.
Applicant's further arguments dated Oct. 25, 2002.
PCT International Preliminary Examination Report dated Nov. 25, 2002.
Schoonderwoerd et al, "Ant-Based Load Balancing in Telecommunications Networks", Adaptive Behavior, US, MIT Press, Cambridge, MA; US, vol. 5, No. 2, Sep. 21, 1996, pp. 169-207.

* cited by examiner

Fig 2.7 Ratios of throughput (scatter/SPF) for (m-5)<connectivity<=m.

PACKET ROUTING

This application is the US national phase of international application PCT/GB01/03012 filed 5 Jul. 2001 which designated the U.S.

BACKGROUND

1. Technical Field

This invention concerns the routing of packets in packet-based networks.

2. Related Art

The performance of the internet is renowned for its inconsistency. Sometimes a document can be downloaded instantly; at other times, the same document takes a hundred times longer to appear. As a result, there is a lot of research effort directed at reducing internet congestion. Some groups favour resource rationing (K Danielsen and M Weiss, "*User Control Modes and IP Allocation*", MIT Workshop on Internet Economics, March 1995), other groups seek to increase routing intelligence (G Di Caro and M Dorigo, "*AntNet: Distributed Stigmergetic Control for Communication Networks*", J. Artificial Intelligence Research, 9, p. 317, 1998) to avoid congested regions of the network. It is generally understood that Shortest Path First (SPF) routing results in unnecessary congestion by focusing all traffic on to the same paths.

The problems associated with SPF are well understood. Some attempts to overcome this problems focus on traffic engineering, for example: Davie et al. ("*Optimal use of multiple paths in IP networks*, IEE 16$^{th}$ UK Teletraffic Symposium on 'Management of quality of Service—The New Challenge', Harlow, May 22-24, 2000), Holness and Phillips ("*Dynamic QoS for MPLS Networks*", IEE 16$^{th}$ UK Teletraffic Symposium on 'Management of quality of Service—The New Challenge'), Murphy et al (*On Design of Diffserv/MPLS networks to Support VPNs*, IEE 16$^{th}$ UK Teletraffic Symposium on 'Management of quality of Service—The New Challenge') and Webb ("*Traffic Engineering in IP Networks: What Does it Offer?*", IEE 16$^{th}$ UK Teletraffic Symposium on 'Management of quality of Service—The New Challenge'). Some of these approaches involve sophisticated schemes for speeding up traffic flow across a network. Currently, the idea of using explicit routes is popular. However, although the use of explicit routes is a workable traffic engineering mechanism, Davie et al. do not address how these routes should be chosen initially or under what conditions they should be activated. No criteria for path optimisation are proposed for use with this approach. Optimised paths could be set if traffic flow were predictable, but this is not the case. The Holness and Phillips scheme aims to guarantee QoS by reserving bandwidth for particular classes of traffic. Whilst guaranteed QoS is desirable, reserving resources is wasteful. Also, their dynamic choice of routes seems to require a heavy overhead of signalling and negotiation. The work by Murphy et al. considers traffic load balancing, but does not couple this to convergence on destination.

BRIEF SUMMARY

According to a first aspect of the present invention there is provided method of routing a data packet at a network node, the method comprising the steps of:

(a) determining the number of valid node outputs that the packet may be routed to;

(b) generating a routing factor for each of the valid node outputs that the packet may be routed to; and (c) randomly selecting one of said valid node outputs, wherein the probability of selecting one of the valid node outputs is related to the respective routing factor for that node output. Preferably, the probability of selecting one of the valid node outputs is inversely proportional to the respective routing factor for that node output.

The routing factor may depend upon any, some or all of the following: the time that the packet would be buffered in the respective output buffer; the time that the packet would be buffered in the respective input buffer; the packet transmission time to reach the respective node; or the number of hops that the packet would take to reach the ultimate destination of the request using the shortest path.

According to further aspects of the present invention there are provided a network node configured, in use, to operate according to any of the above methods; a communications network comprising one or more of such network nodes; and a data carrier containing computer code for loading into a computer for the performance of any of the above methods.

Advantageously scatter routing gives significantly better throughput than SPF in congested conditions, for a wide range of network connectivities, and performs only slightly less well when the network has no congestion. Another factor that affects relative routing performance is network structure. Whilst there are network topologies that can be devised (*Optimising Network Architectures*, P Bladon, G Chopping, B Jensen and T Maddern, IEE 16$^{th}$ UK Teletraffic Symposium on 'Management of quality of Service—The New Challenge').that are inherently good at balancing traffic load, asymmetric demand for services will still result in under-utilisation of network resources using Shortest Path First. Scatter routing does need sufficient connectivity in order to out-perform SPF. Lack of homogeneity in connectivity per se is not a problem, as long as it does not result in connectivity falling so low in parts of the network that parallel paths no longer exist. Simulations show that connectivity with m=25 is optimal, but connectivity with m=10 with a variability of 5 is sufficient to give good results. The implication of this could be that nodes in a network with few connections could operate SPF but could pass packets to more richly connected neighbours, where scattering over parallel paths could take place. Connectivity with m greater than 25 does not improve the performance of scatter routing in our simulation. Even for very large networks, with the simulation parameters as set here, connectivity with m=25 is sufficient for optimal route parallelisation.

Further advantages of the present invention are that scatter routing does not require global knowledge. Needing only local knowledge makes scatter routing dynamically adaptive and reduces the memory needs of the routers, compared with routing protocols that maintain knowledge of multiple end-to-end paths. Scatter routing can also make use of existing SPF routing infrastructure and methodology. The advantage of this is that its implementation would not require radical change to what is already in place. Scatter routing would add an overhead of complexity to the existing routing system. However, compared with some complex schemes that have been proposed, using RSVP and MPLS, our proposal is relatively simple.

Scatter routing could be used to differentiate between traffic having different priorities, simply by varying the constant k associated with a packet. (the greater the value of k the more closely the route follows the shortest path.)

BRIEF DESCRIPTION OF DRAWINGS

The invention will now be described, by way of example only, with reference to the following figures in which.

DETAILED DESCRIPTION OF EXEMPLARY EMBODIMENTS

Figure 1:
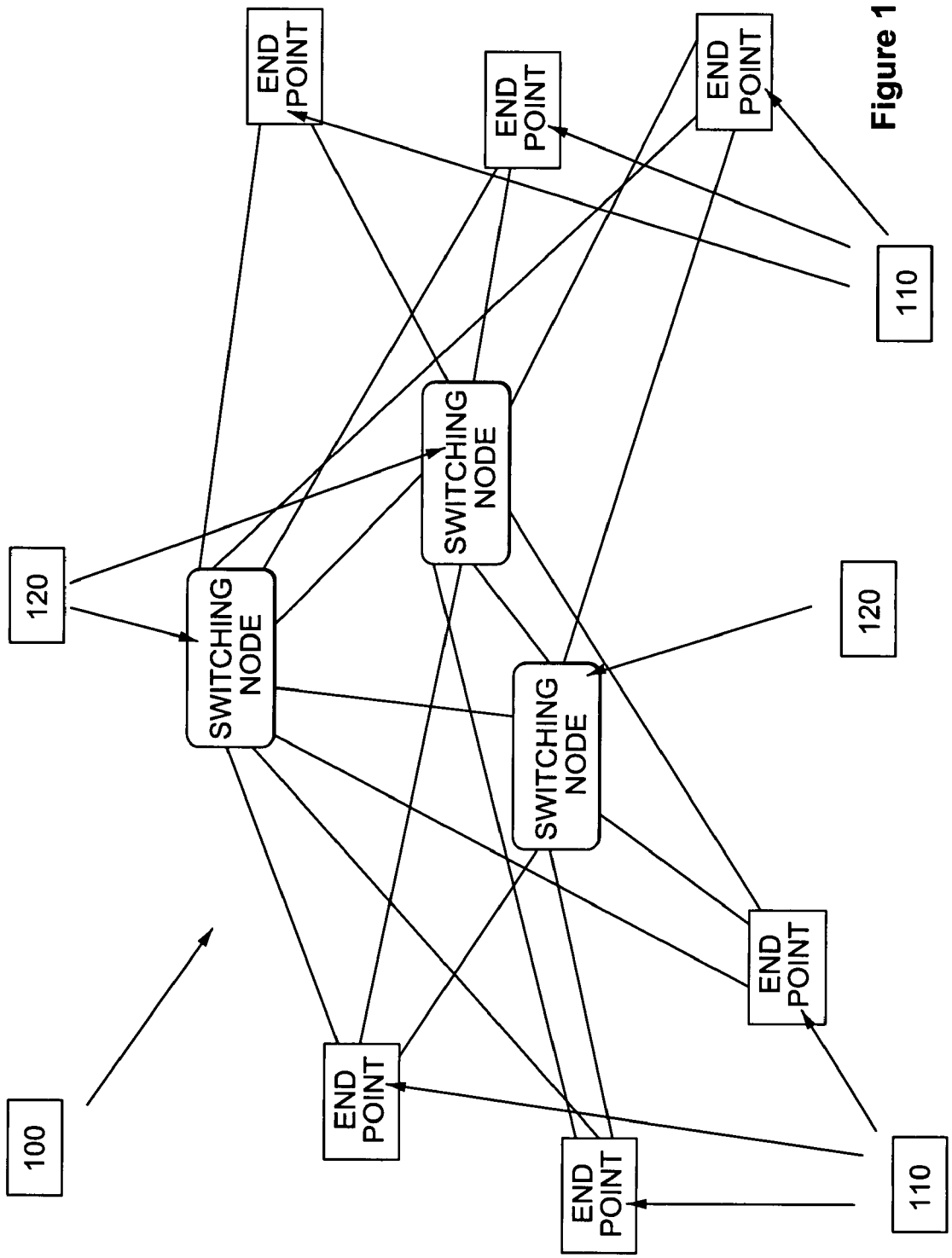
FIG. 1 shows a schematic depiction of a communications network which is operated according to the present invention.

FIG. 1 shows an example of the sort of network that can be used with the method of the present invention. Network 100 comprise a plurality of switching nodes 120 and a plurality of endpoint nodes 110. In the network shown in FIG. 1 there are six endpoint nodes 110 and three switching nodes 120, all of which are fully inter-connected (i.e. there is a direct connection for each node to all of the other nodes, whether an endpoint node 110 or a switching node 120, in the network. As networks grow it becomes infeasible to have a fully inter-connected network and each a maximum number of connections, m, is defined for each network node. The value of m may be constant for all of the nodes within the network or constrained within a range of values.

In order to demonstrate the advantages of the present invention a number of different networks were generated in order to perform a number of simulations. The rules used to construct the simulated network were in general as follows. First, 2 switching nodes were positioned randomly in space and linked together, then another switching node was positioned randomly in space and linked to the first two nodes, assuming that m≧2. Connections made from a new node may not go to the same node more than once. Therefore, until the number of nodes in the network exceeds (m+1), the addition of a new node simply means adding a connection to each of the nodes already in the network. Once the network comprises (m+2) nodes, the choice of node to which a new node will connect to is weighted towards those nodes that are already more highly connected. This, to some extent, simulates the way 'true' networks grow ("*Emergence of Scaling in Random Networks*", A-L Barabasi and R Albert, *Science*, 286, 1999, 509). In some of the simulations, the choice of which node(s) that a new node would connect to also depended upon its proximity to the newly added node, in order to make the network regions more distinct. The significance of the length of a link, in the simulation, is that it was used to set the transfer time of packets along the link. The simulations were limited to networks having sizes that varied between 12 and 112 nodes, although it is believed that the present invention would scale to larger sized networks.

At the start of each simulation, the full network capacity is available, that is, there are no requests already in the system. Then, requests arrive at endpoint nodes on the network. In most experiments carried out, the requests arrive at a constant rate, irrespective of the size of the network, which leads to the smallest networks becoming more congested than larger networks. The type of request and the endpoint node at which it arrives are chosen randomly.

Having constructed a network, each endpoint node was assigned a number of virtual nodes, vnode (the number of which was constant for a given network), each of which was randomly assigned a request handling ability: simply one of a possible maxservices number of services. Then routing tables were set up at each node for the standard Distance Vector Routing protocol, so that, for each service available on the network, each node knows to which neighbour it should pass any request to ensure the fewest number of hops in order to reach its destination and also the number of hops that this route will take. The routing tables were set up to determine a request destination by service, rather than node address.

The premise of the present invention, which will be referred to as scatter routing, is that it is better to use more of the available network resources, rather than simply channelling all requests along the same short routes, as in SPF routing. This premise is valid when the network is heavily loaded because congested routes result in requests 'timing out' in queues and overflowing buffers. When the network is uncongested, using the shortest path is optimal, but we argue that the difference between scatter routing and SPF under these conditions is not significant; the critical conditions occur when there is heavy demand, and this is when scatter routing is most advantageous.

In the network simulations, a packet flow is divided up into 10 packets which are treated independently (clearly, packet flows can be divided into different number of packets). The next hop for each packet is chosen probabilistically by comparing what we have termed the 'resistance' of available options. The calculation of the resistance of a given hop is given as follows:

$$\text{resistance} = t\text{buffer}^O_i + tq_i + t\text{trans}^O_i + k \text{ hop}^i_d,$$

where, $t\text{buffer}^O_i$ is the time the packet would spend in the output buffer from the current node O;

$tq_i$ is the time the packet would spend in the input buffer of the next hop node i;

$t\text{trans}^O_i$ is the transfer time between nodes O and i; k is a constant; and $\text{hop}^i_d$ is the number of hops that the packet would take from node i to the destination of the request, using the shortest path.

The probability of choosing a given neighbouring node is made inversely proportional to the 'resistance', i.e. the option having the greatest resistance is least likely to be chosen, although this does not mean that it will not be chosen by at least one of the packets in the stream. Thus, when a random number is generated, the range in which the random number generator can choose a number (for example 1 to 10000) is divided up into sections, one for each of the available routes to a node, each section having a size inversely proportional to the 'resistance' of the route via that node. The section in which the random number falls corresponds to the node to which the packet is passed.

Only two constraints are applied to the choice of next hop for a packet. Retracing a step is prevented, unless a dead-end has been reached and an endpoint node that is unable to handle the request will not be chosen. In this way, in general, a neighbouring node is chosen for the next hop if the route to it is uncongested, and if this step makes satisfactory progress towards the packet destination. In practice, these two constraints require that each node has a knowledge of the services offered by all of the nodes to which it is connected (which is not a serious memory implication), and packets (or a packet at the head of a flow, for larger scattered units) would have to have header space to maintain a list of the nodes through which they had already passed.)

The choice of route is made at each node along the way. Because decisions are made without global knowledge and are made probabilistically, rather than absolutely, scatter routing should not result in routes oscillating unstably, as is possible in routing methods that rely on congestion measurement.

Scatter routing implies the overhead of knowing the lengths of queues on connected nodes, and of knowing the number of shortest path hops for each service from each connected node, rather than just from the originating node, as in SPF. This will probably limit the scalability of scatter routing. However, the scaling would not be a problem within a core network, and if the core network operated efficiently this would have great benefits for the operation of the internet in general.

The corresponding advantage of having routing knowledge for a particular destination via all a node's neighbours, is that the routing operation is not disrupted by convergence delays in the routing tables after a link failure. With SPF alone, it can take a significant length of time for the knowledge of a failure to propagate through the system. During this time, packets continue to be forwarded along routes towards the failed link, and then time out waiting for a new route to be found. But, with scatter routing, not only will packets utilise multiple paths (and therefore have less chance of encountering the broken link, for a given destination) but, arriving at a node where the next hop is unexpectedly broken is not disastrous. The routing algorithm will simply route around the broken link, because the use of all possible routes is normal. As the packet is prevented from retracing its steps, it is forced to discover a new route around the obstacle. This property might greatly reduce the frequency of update messages needed, compared with standard Distance Vector routing, and prove a significant advantage.

Additionally, scatter routing results in a greater proportion of the network being used than with SPF, and, because the load is spread better, there is much less chance of local congestion arising than when using Shortest Path First.

The 'resistance' function determines the next hop without the need for a heavy overhead of messages or agents to monitor performance. Scatter routing optimises the choice of paths without the need to predict traffic flow. In addition, the scatter routing algorithm responds to traffic flow dynamically, with the speed of adaptation limited by the rate of update of queue lengths. The paths followed are evaluated node by node, and therefore respond much faster to traffic variation than do paths in schemes that choose routes at the ingress to a network region.

The simulation models splitting up requests of 10 packets into their constituent packets, and making routing decisions packet by packet. This level of control is probably too great for realistic implementation, but the principles tested here would still be valid for dividing up flows into much larger pieces, as long as the relative splitting, compared with SPF, remained the same.

Furthermore, resources do not need to be pre-allocated, so bandwidth capacity is used efficiently for all classes of traffic. If differentiating traffic is important, this could be achieved within scatter routing by labelling a packet with a priority that would determine the constant k used for forwarding. The greater the value of k, the more closely the routing follows Shortest Path First. In this way, high priority packets could be routed along the shortest paths, whilst others avoid contributing to local congestion by taking longer routes. Note that, for scatter routing to work, each node needs to know the lengths of input queues on its neighbours accurately, within the time frame of the routing decision. It has been assumed that this would be possible, without testing a method or evaluating its performance. In addition, during this work, we have not been concerned with the ordering of packets within a request, or the re-sending of lost packets. Whereas SPF naturally leads to consistent packet order, scatter routing does not.

We have assumed that the arrival window of scattered packets is small enough that the time needed for re-ordering does not impair performance.

The first set of experiments compared request handling throughput for simulations networks of varying size with the same rate of request arrival. Therefore, the smaller the network, the greater the congestion. In these simulations, a request of 10 packets arrived at one of the endpoint nodes every timestep for 200 timesteps, followed by 12 requests arriving every 20 timesteps.

The main focus in giving results has been on comparing throughput during a finite period when there is a surge in demand on the network. The latency of a request is measured as the time taken for all ten packets of a request to be handled at a distant node, and then passed on to a request destination. This request destination is a node, chosen at random, when the request is first generated. These two stages of the request's progress are independent. Note that, in FIG. 2, the results presented only include requests for which there has been zero packet loss.

Figure 2:
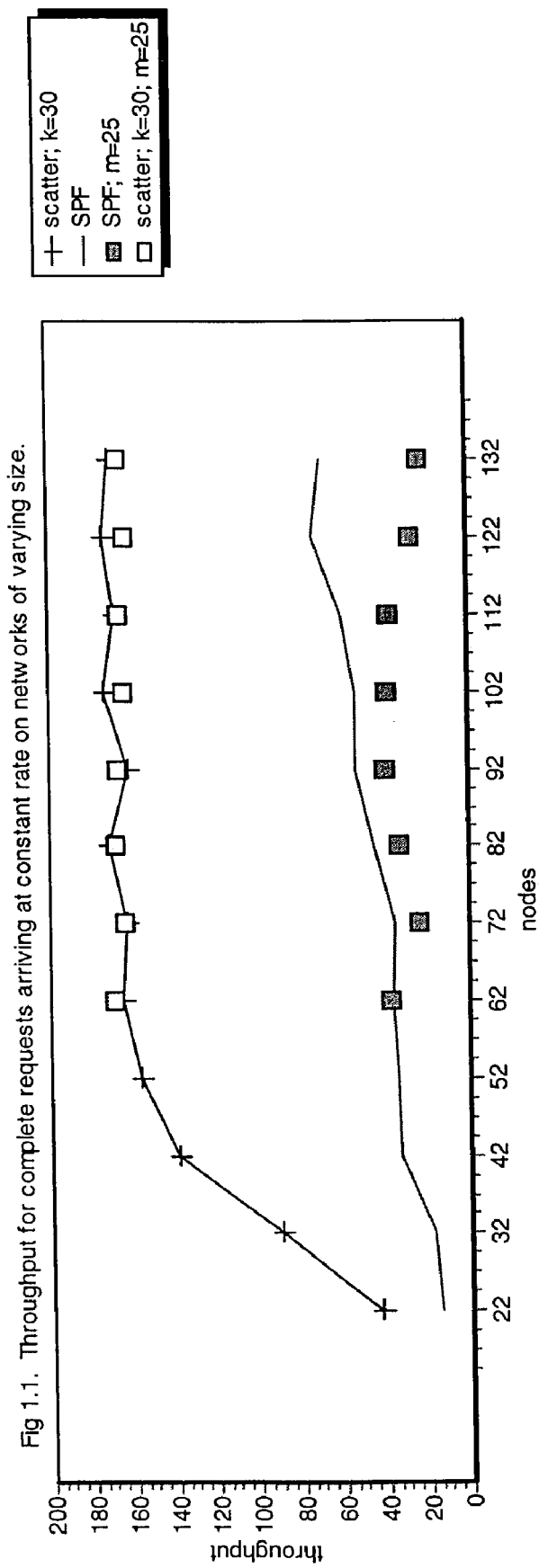
FIGS. 2-14 shows a schematic depiction of computer telephony terminals connected to a communications network.

In the first simulation, the results of which are shown in FIG. 2), the two lines represent the throughput of networks that are fully connected in a homogeneous way. For example, if the network has 32 endpoint nodes and 30 switching nodes, then m will be 30. Note that, as the network increases in size, so does the number of services that can be requested. The services are distributed randomly over the virtual nodes on the endpoint nodes. Each endpoint node has a number of virtual nodes such that, on average, 20% of its traffic will be handled at the node where the request originates The results presented in FIG. 2 show that, as the network increases in size, i.e., as its capacity increases, the performance of both scatter routing (the line connecting the crosses) and SPF (represented by the plain line) improves. However, scatter routing attains close to optimal performance very rapidly, whereas SPF continues to result in relatively low throughput, because of a large proportion of requests in which packets are lost.

The plots with square symbols repeat the above simulations with an m value of 25, i.e. a network that is not fully interconnected. FIG. 2 shows that the performance of scatter routing is very similar to that with a fully connected network, whereas SPF seems to show a slight worsening of throughput as the size of the network increases. Again, scatter routing provides significantly increased throughput when compared to SPF routing. This illustrates that fully connected networks are not necessary for scatter routing to perform well. In fact, it is the performance of SPF that suffers more by reducing connectivity, because of the creation of bottlenecks that lead to congestion.

Figure 3:
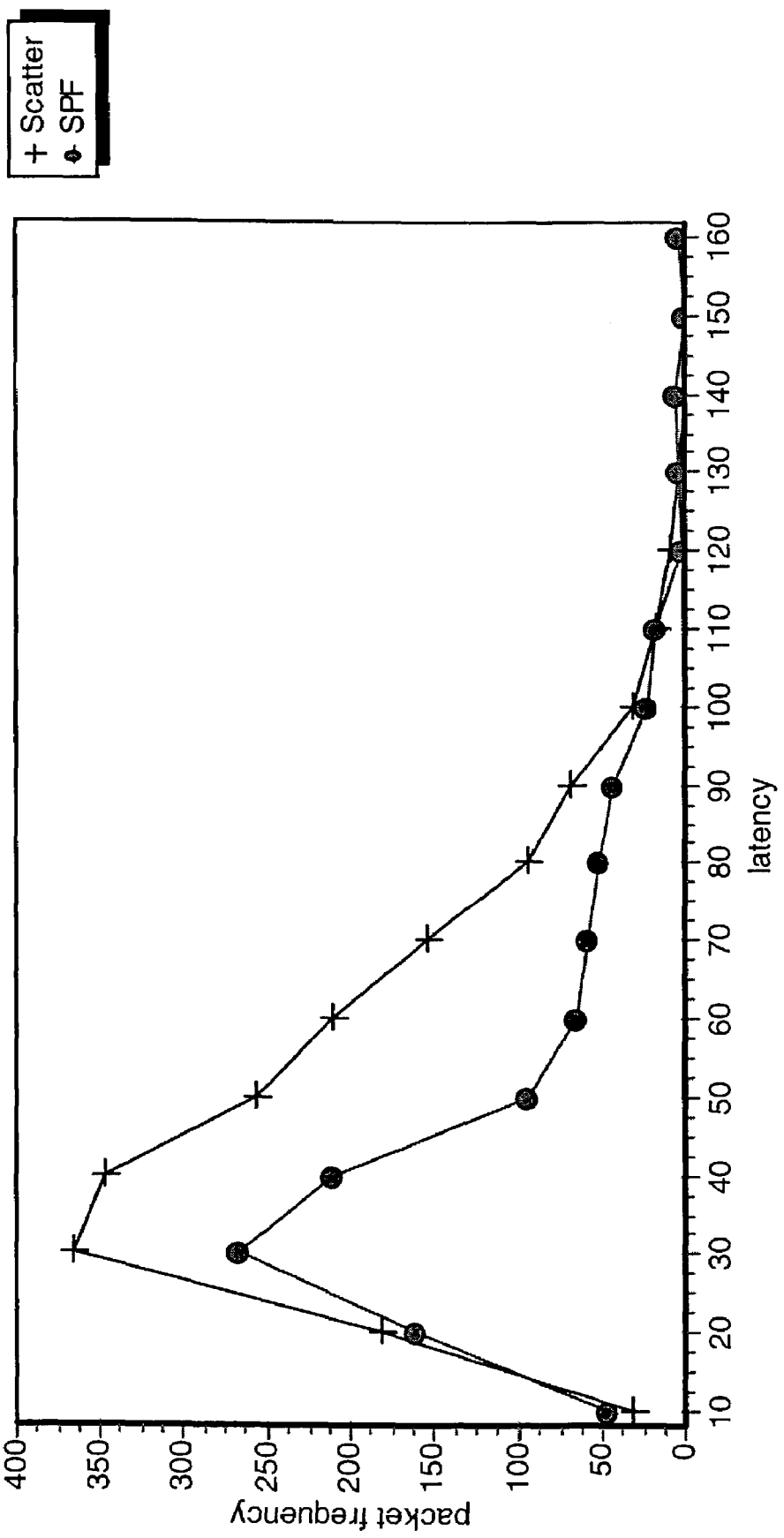
Figure 4:
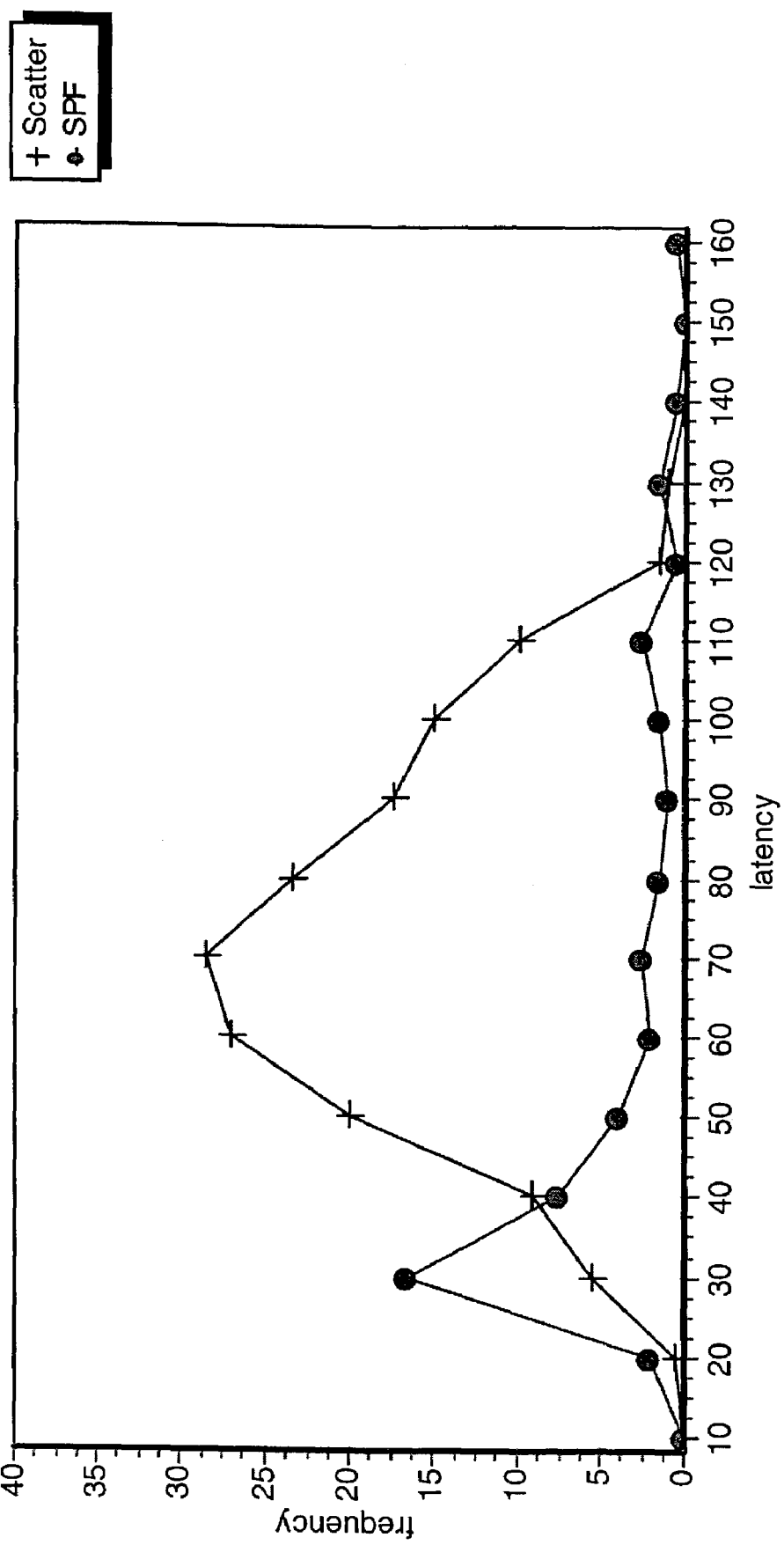

FIG. 3 shows the frequency distribution of latencies for a network having 27 endpoint nodes, 25 switching nodes and an m value of 25 (i.e. a fully interconnected node), with latencies being recorded for each packet. This gives a somewhat different impression from the results shown in FIG. 2, because we are not discounting packets that are in a request in which packets have been lost. FIG. 2 shows that the throughput for SPF appears much better, but that scatter routing still performs better than SPF. With scatter routing, there is no packet loss, whereas nearly 40% of packets are lost using SPF routing. The latency frequency plot for completed requests, for the same network and simulation conditions, is given in FIG. 4.

Figure 5:
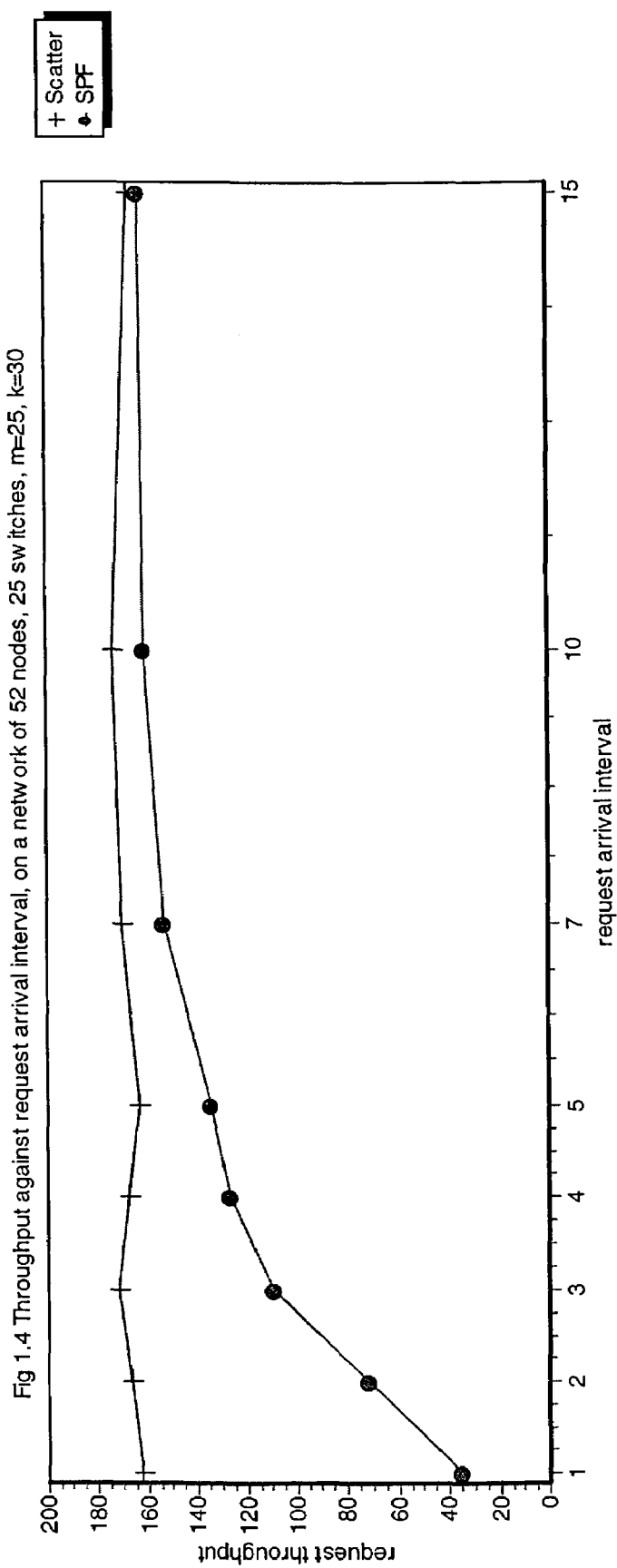

Another way of illustrating the conditions in which scatter routing performs well is to plot request handling throughput against the interval between request arrivals. This is just another way of varying the level of congestion, again using the same network size and connectivity (i.e. 27 endpoint nodes, 25 switching nodes and an m value of 25). The results are shown in FIG. 5 with each data point being the average of 2 simulations. FIG. 5 indicates that the request throughput for scatter routing remains consistently high for all request arrival intervals, whilst the throughput for SPF routing falls off significantly as the request arrival interval decreases. Note that, for all request arrival intervals, there is no packet loss in these simulations for scatter routing, whereas, using SPF, there is a packet loss of 1% for requests arriving at intervals of 10 and 15 timesteps, 2% for requests arriving at intervals of 4, 5 and 7 timesteps, and between 10% and 20% for requests arriving at intervals of 2 or 3 timesteps. When the request arrival interval falls to 1 timestep, SPF routing has a packet loss of nearly 40%. Again, we are seeing that scatter routing enables congestion to be diffused over the network, leading to fewer pressure points or 'hot spots', and consequently better request throughput, in spite of using longer routes.

Figure 6:
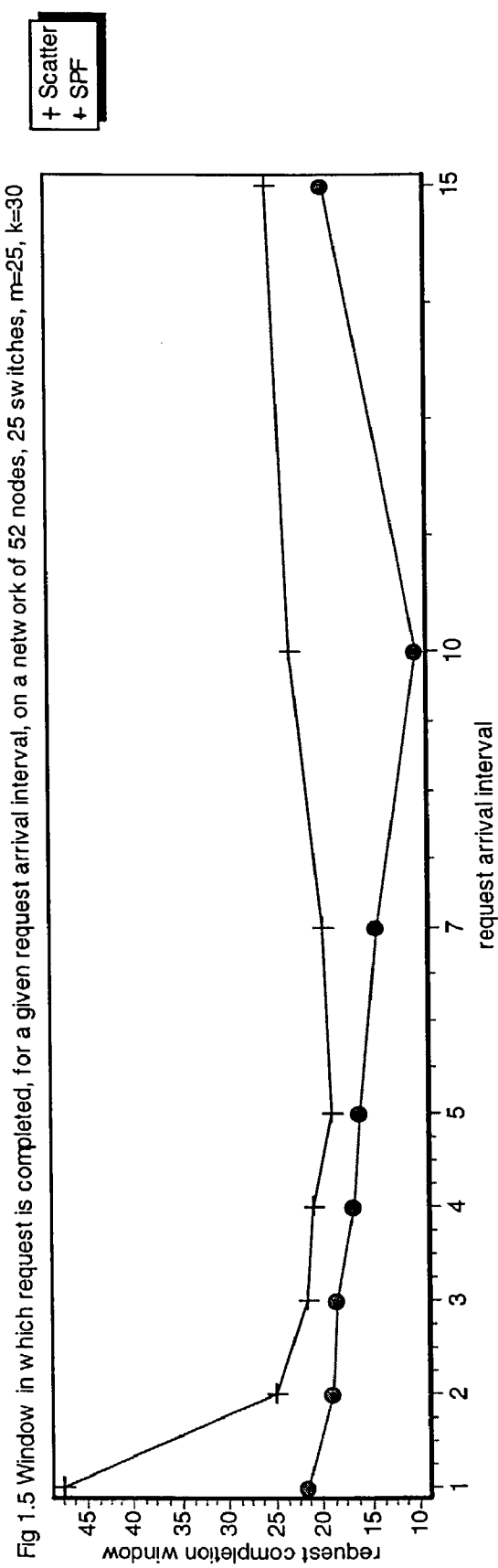

Scatter routing gives a consistently high throughput, even in very congested conditions. However, when we split a request into a number of packets and scatter it over the network, it may be important to know how large the window in which packets from a given request arrive. FIG. 6 shows the average size of window, in which the packets of a request arrive at their final destination. As this only refers to requests in which all its packets arrive, we would expect the SPF window to be smaller. However, we see that, in fairly congested conditions (requests being generated at intervals of 2,3 or 4 timesteps), the window in which packets of a request arrive is not much larger for scatter routing than for SPF. In the most congested conditions, the window for scattered packets is twice the size of SPF packets. However, this result is not surprising, as the only SPF requests that are successful are those that complete their journeys before the network becomes congested.

So far, the simulations have only considered networks that are connected very richly and homogeneously. FIGS. 7 to 13 display simulation results for networks that have varying levels of connectivity. The simulation results for the were generated using a network having 27 endpoint nodes and 25 switching nodes, using k=30 and with a request arrival interval of 1 timestep. m is chosen randomly for each node from a specified range of values, with a different range being used for each simulation. Each data point on the graphs of frequencies of latency was generated as the average of 3 simulations and only complete requests of 10 packets were recorded.

Figure 7:
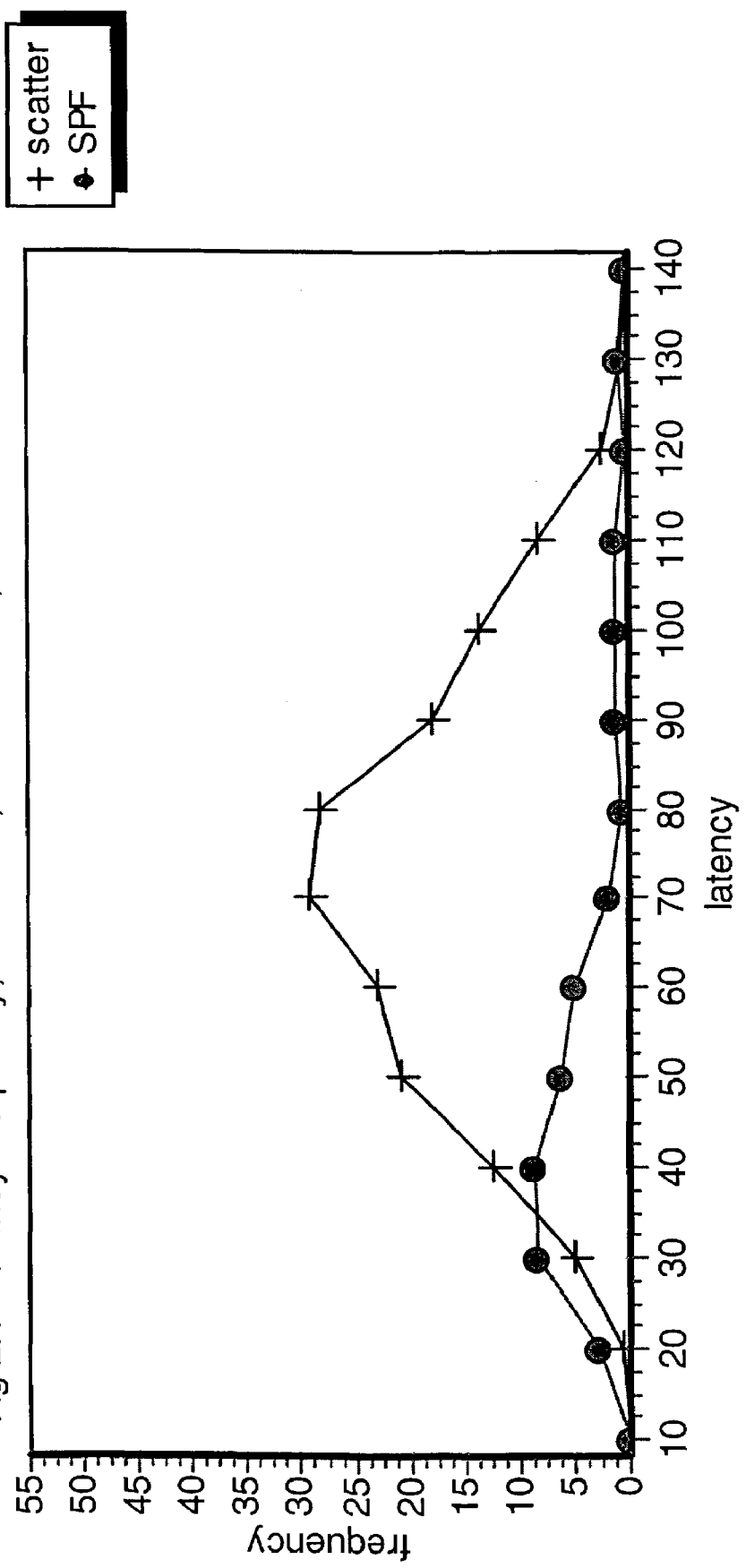

FIG. 7 shows a typical comparison of scatter routing versus Shortest Path First during a surge in demand on a network of 27 endpoint nodes, 25 switching nodes and with the connectivity given by 20<m☐25 (in order to keep the average load on the nodes approximately the same for these simulations the average request arrival intervals were increased in proportion to the decrease in connectivity). This network is still highly connected with slightly reduced homogeneity when compared with the networks that have been simulated and discussed above. Although SPF handles slightly more requests than scatter routing at low latency, as the surge in demand continues, the SPF handling rate drops while scatter routing continues to handle requests, so that, overall, scatter routing handles far more requests than SPF.

Figure 8:
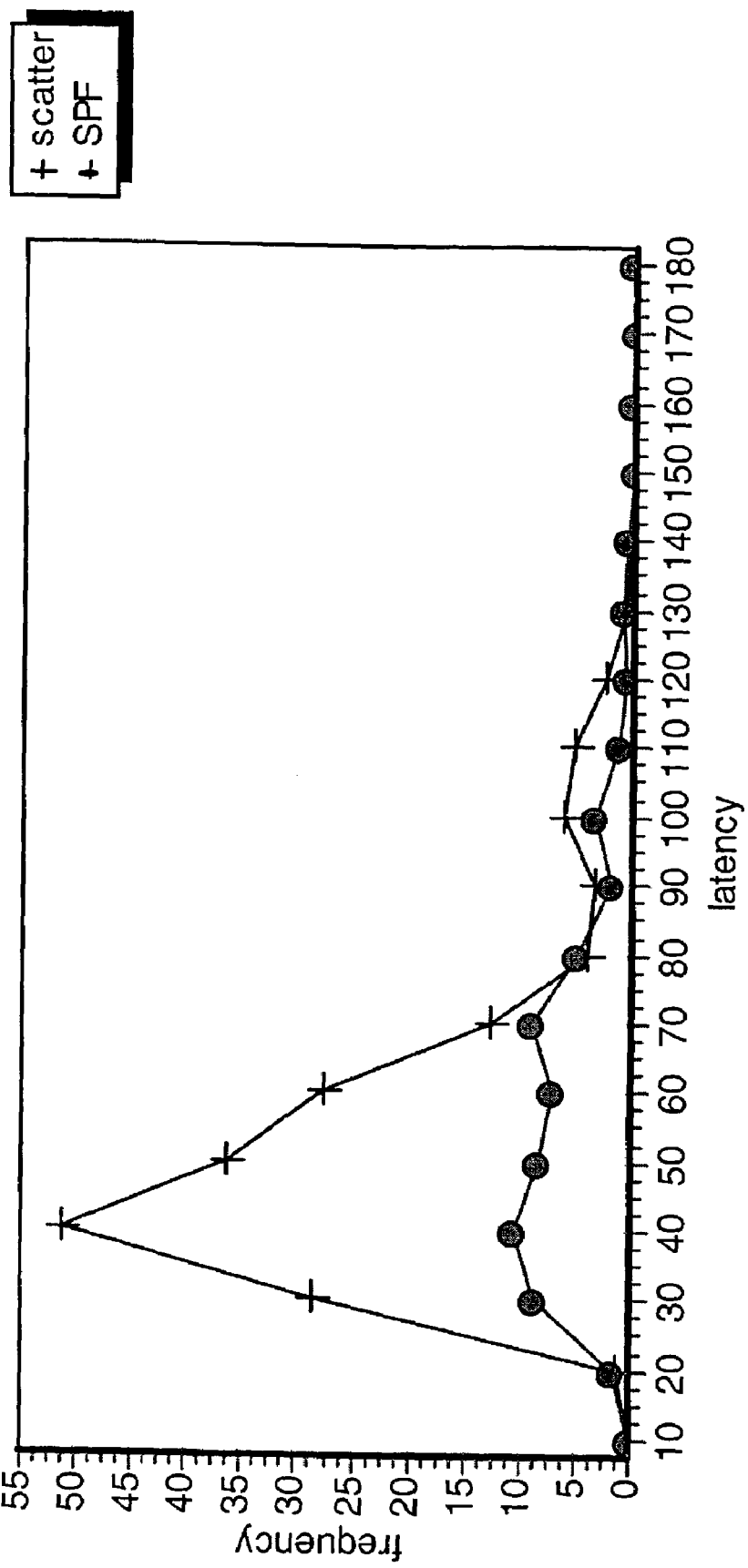
Figure 9:
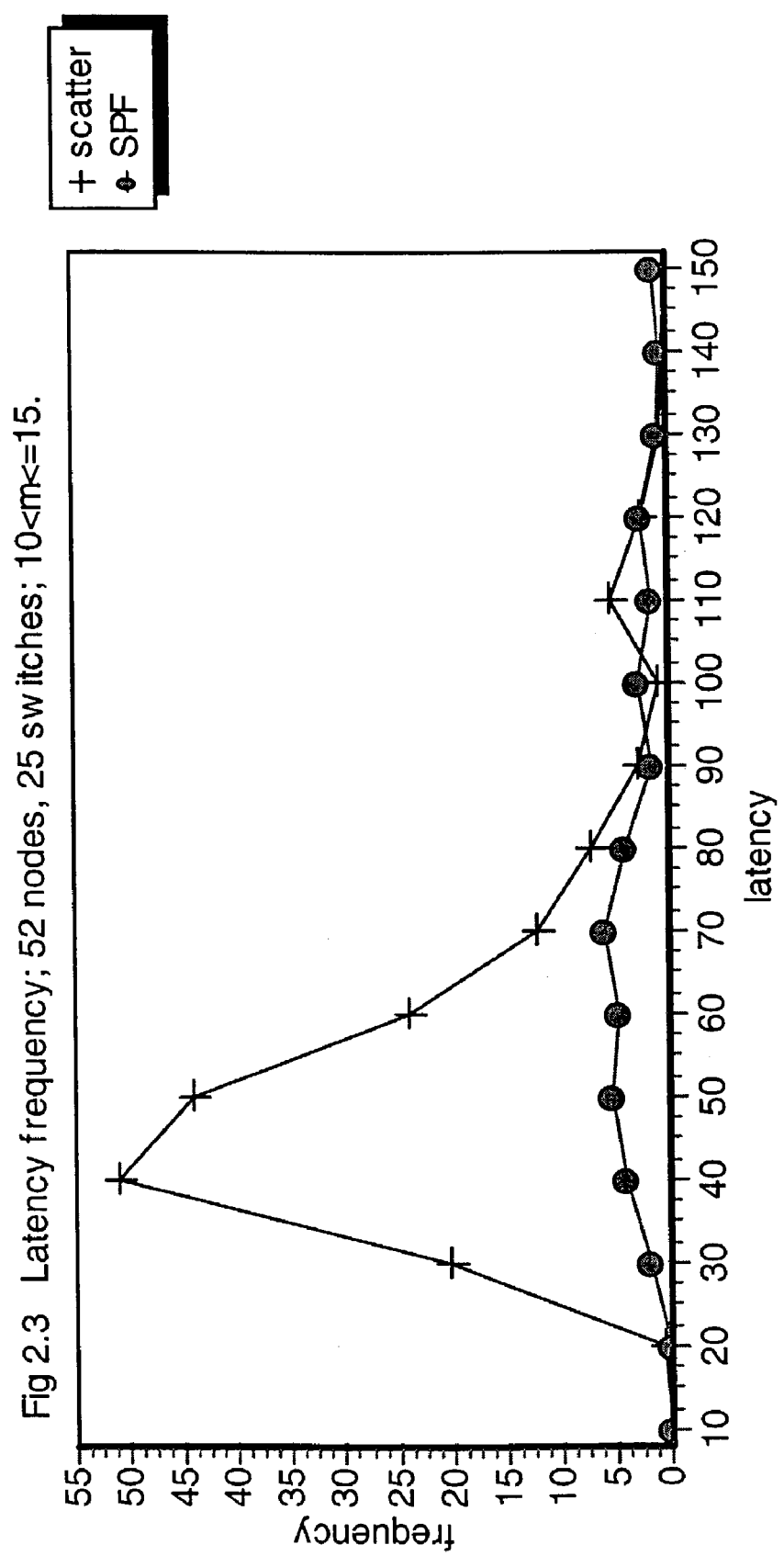

In FIG. 8, the network connectivity is chosen to be in the range 15<m☐20, giving a network that is less homogeneous and less highly connected The slightly longer request arrival intervals allow both SPF and scatter routing to have greater throughput at lower latency, but this effect is most marked for scatter routing, with the window for requests arriving at their final destinations now comparable with SPF. Clearly, the reduction in connectivity does not impair the performance of scatter routing. In FIG. 9, the connectivity is given by 10<m☐15. This is a significant reduction in homogeneity and connectivity. However, scatter routing is unaffected by this change, with a very similar throughput to that shown in FIGS. 7 & 8. Furthermore, the window in which requests arrive at their final destinations is now greater for SPF than scatter routing.

Figure 10:
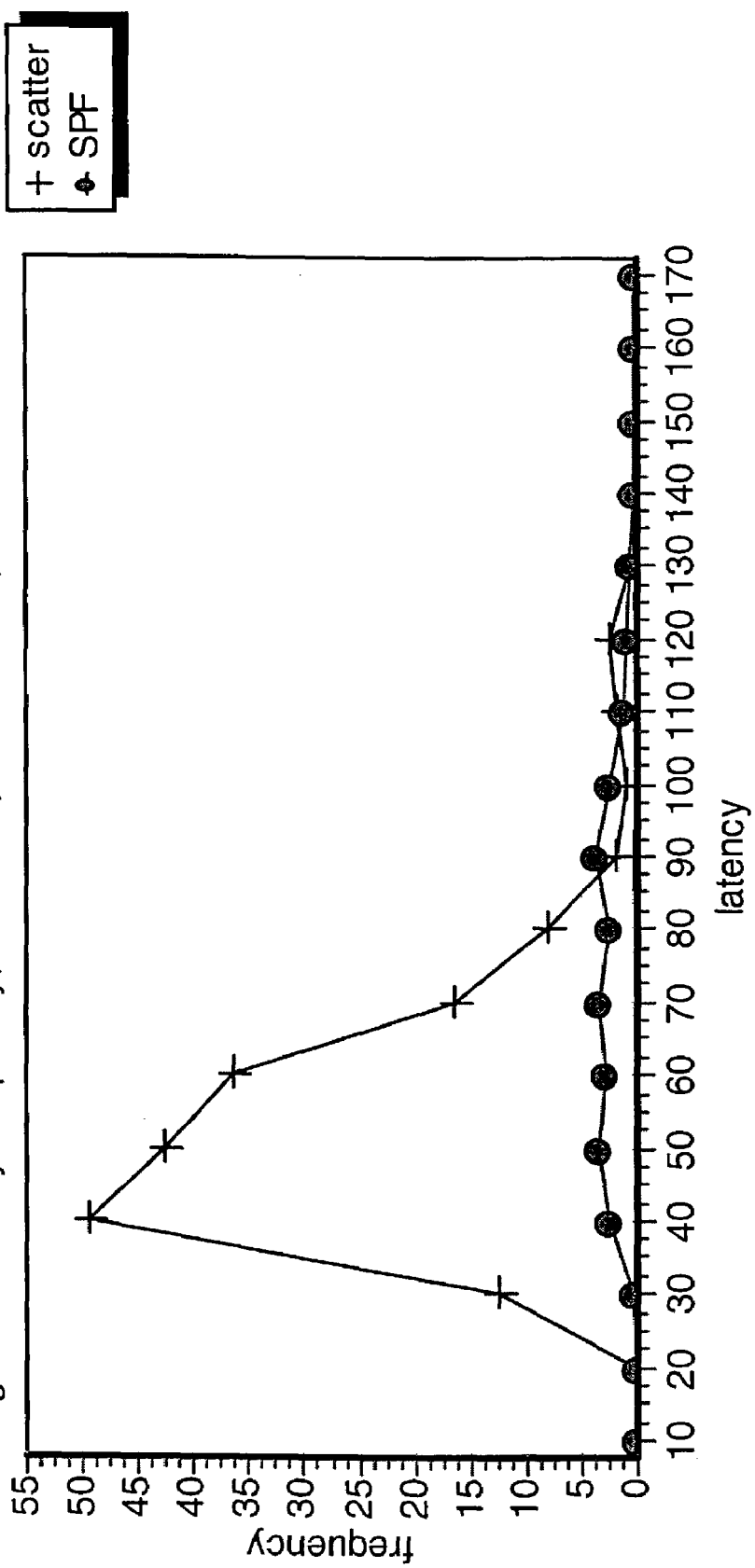
Figure 11:
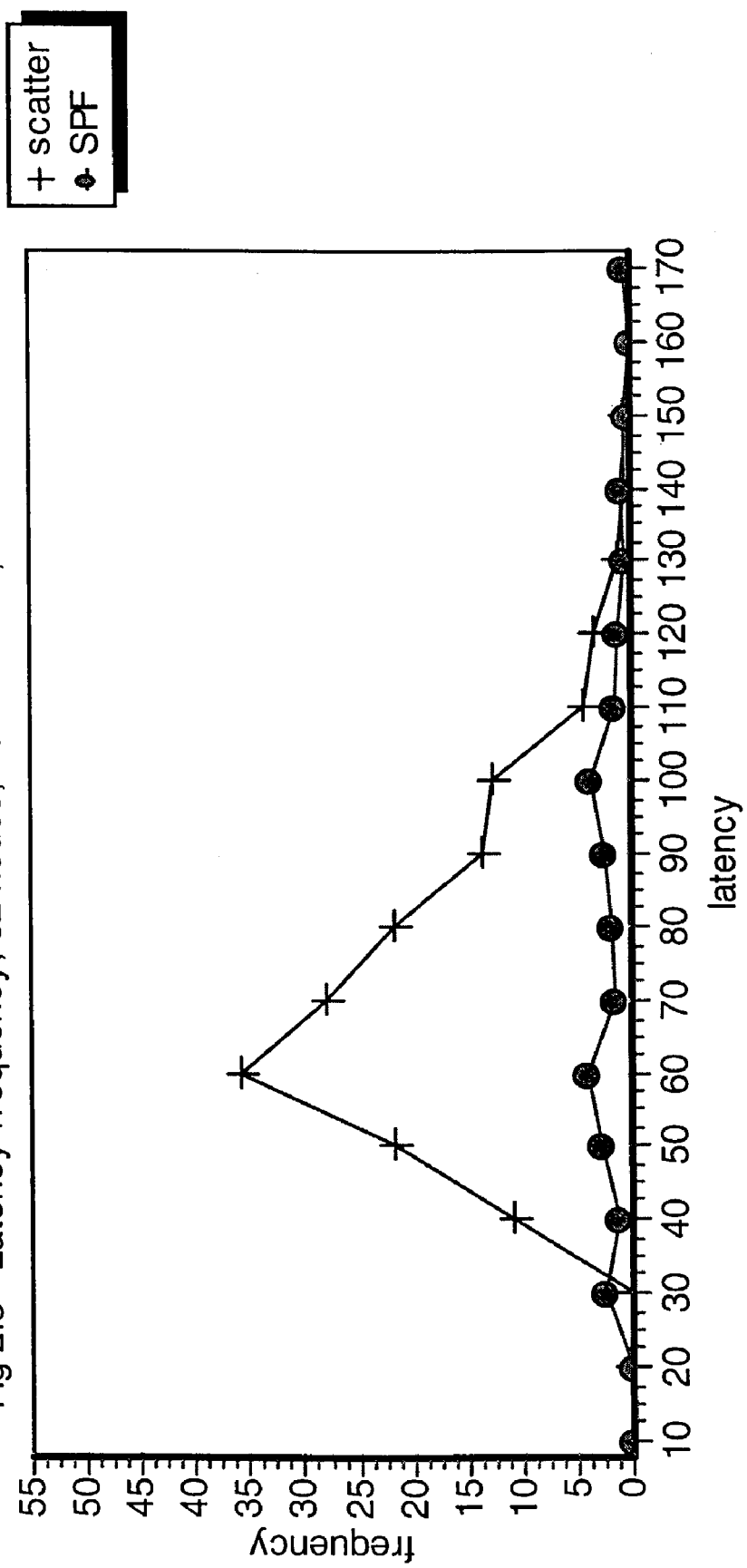

In FIG. 10, the network connectivity range is 5<m☐m10. Although scatter routing has to route through some of the same bottlenecks that SPF experiences, it has sufficient alternative routes to give a much higher relative throughput than SPF. The reduced connectivity means that SPF has to route through more hops to reach its destinations, and this reduces its throughput, as well as increasing the window in which requests arrive at their final destinations, which is now significantly larger for SPF than for scatter routing. In FIG. 11, the network connectivity is given by 2<m☐7. Under these conditions, scatter routing begins to lose its advantage over SPF, both in terms of the throughput and in the window in which requests arrive at their final destinations, although both are still better when compared with scatter routing. Some packets (about 1%) are lost with scatter routing, compared with approximately 40% with SPF.

Figure 12:
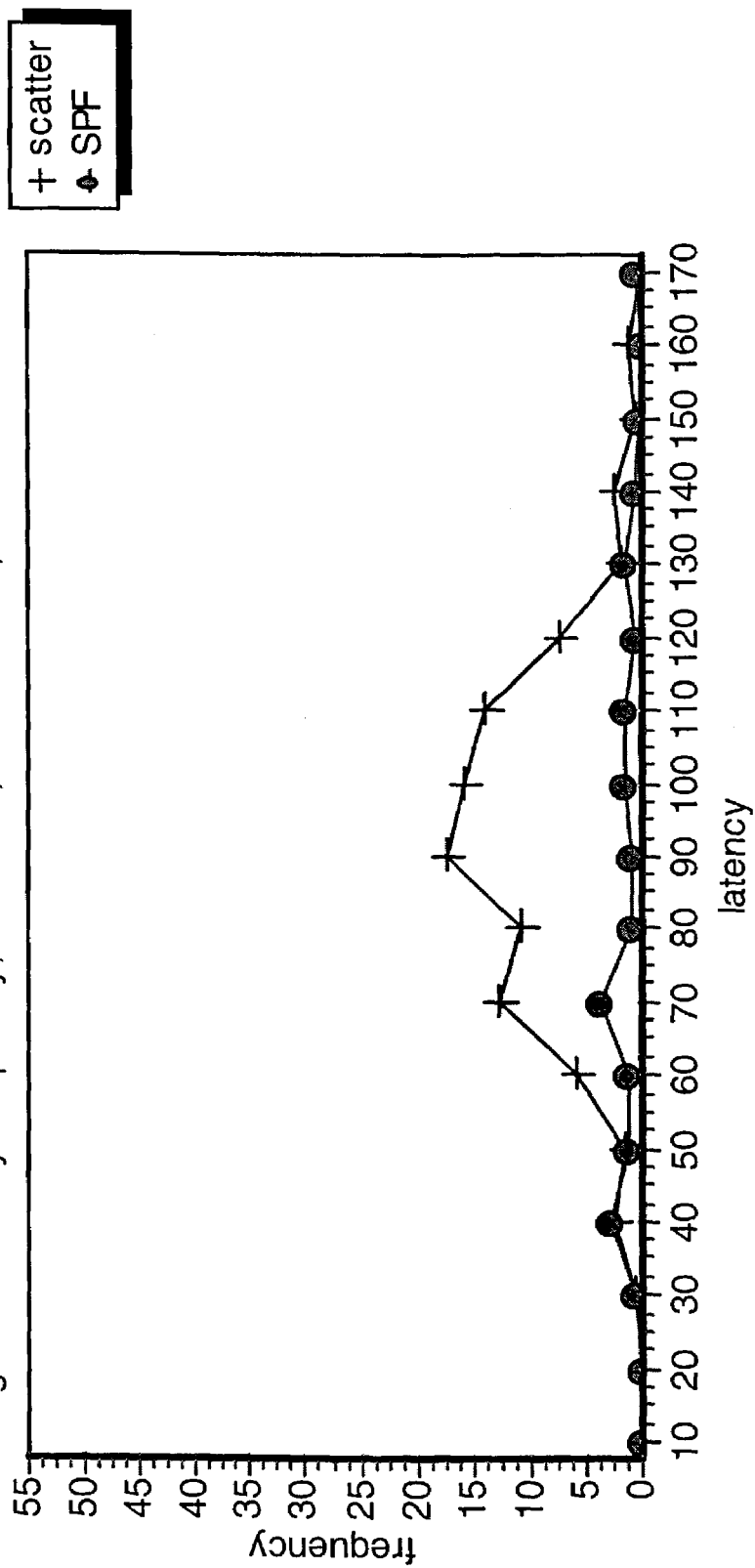
Figure 13:
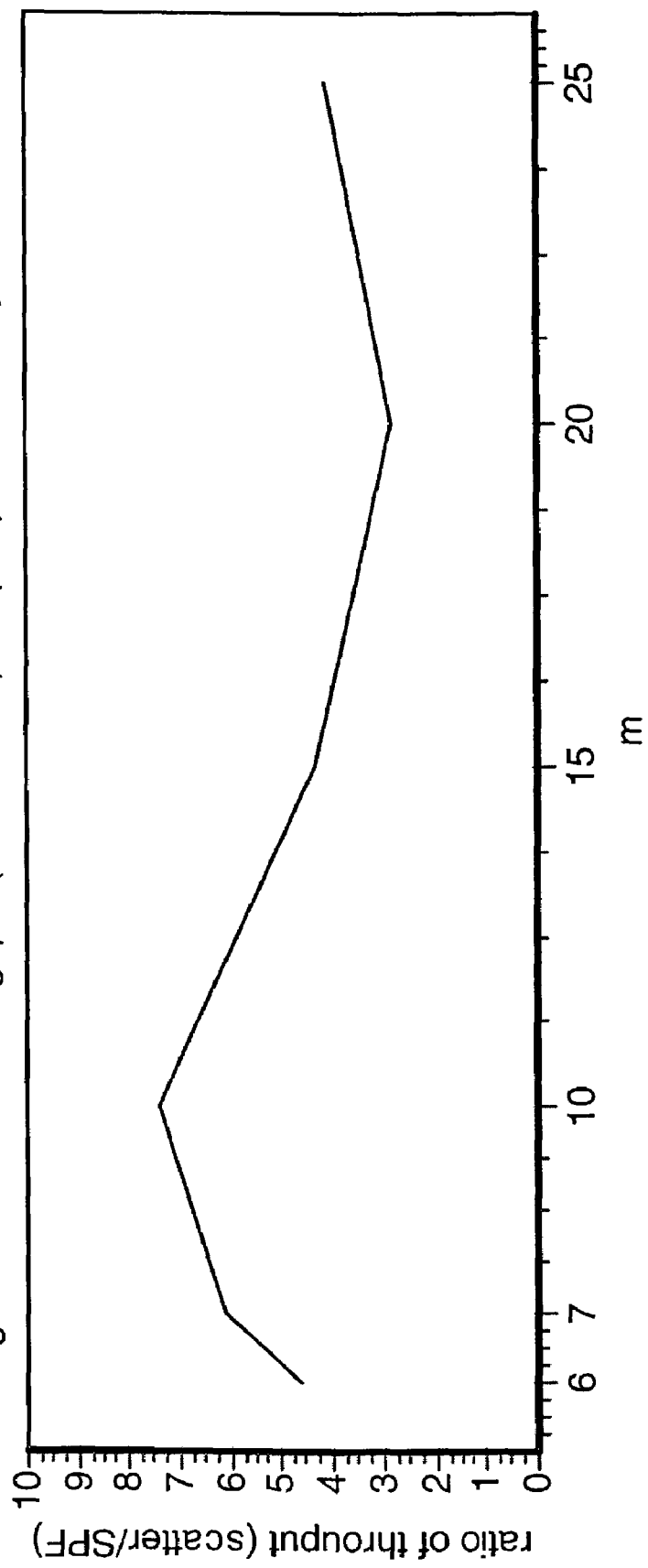

In FIG. 12, the network connectivity is given by 1<m☐6. This results in a significant reduction in throughput with scatter routing, and enlarges the window in which requests arrive at their final destination to 20% greater than with SPF. The packet loss with scatter routing is about 6%, compared with packet loss of nearly 50% for SPF. This connectivity is probably the minimum for scatter routing to operate, in its current form. The relative throughput results for the simulation results shown in FIGS. 7 to 12 are summarised in FIG. 13.

Figure 14:
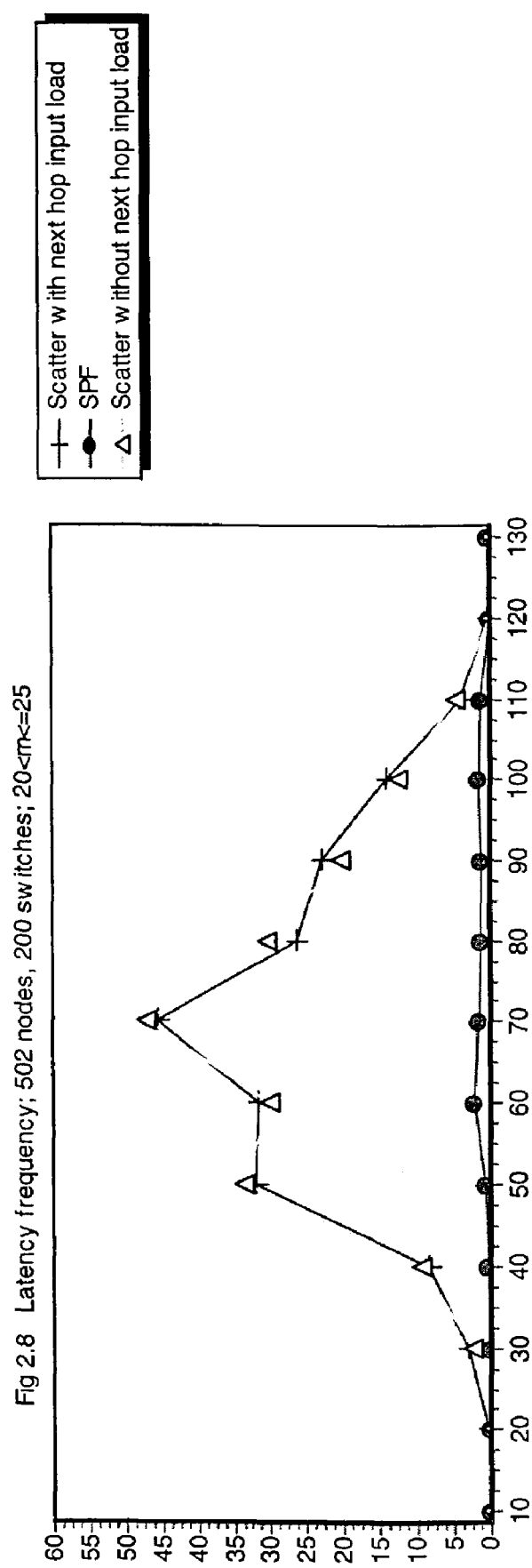

FIG. 14 shows the result of a simulation of a network of 302 endpoint nodes and 200 switching nodes. In this case, there were 10 'virtual nodes' on each endpoint node (i.e. 10 services available), with a total of 50 services for the system as a whole. 512 requests of 10 packets each were generated at intervals of 1 timestep initially, rising to intervals of 20 timesteps at time 200 timesteps. Comparison was made between scatter routing and Shortest Path First routing, as in the above discussion, but this time, scatter routing was implemented as described above and also without incorporating the next hop load, $tq_1$, in the modified resistance factor, i.e., $$\text{Resistance}_{mod} = t\text{buffer}^O_i + t\text{trans}^O_i + k\,\text{hop}^i_d,$$

where, $t\text{buffer}^O_i$ is the time the packet would spend in the output buffer from the current node O;

$t\text{trans}^O_i$ is the transfer time between nodes O and i; k is a constant; and $\text{hop}^i_d$ is the number of hops that the packet would take from node i to the destination of the request, using the shortest path.

Each point shown in FIG. 14 is the average of 3 simulations. The scatter routing implemented using the standard resistance factor is represented by the line connecting the crosses, the scatter routing implemented using the modified resistance factor is represented by the triangles and the SPF routing is represented by the line connecting the circles. FIG. 14 shows again the much greater throughput that can be achieved by using scatter routing. We also see that the performance of scatter routing is not significantly affected by using $\text{resistance}_{mod}$ when determining the routing of a packet as opposed to resistance. Thus, for these simulated networks, knowledge of the next hop input queue load is not necessary for the success of scatter routing. Additionally, it should be noted that scatter routing in this simulation has zero packet loss, whereas SPF leads to about 50% packet loss and that the window in which packets arrive at their final destinations is slightly smaller for scatter routing than for SPF.

What is claimed is;

1. A method of routing a data packet at a network node, the method comprising:
   (a) determining valid node outputs to which the packet may be routed;
   (b) generating a routing factor for each of the valid node outputs to which the packet may be routed;
   (c) randomly selecting one of said valid node outputs, the probability of selecting one of the valid node outputs is inversely proportional to the respective routing factor for that node output;
   wherein the probability of selecting one of the valid node outputs is related to the respective routing factor for that node output; and
   wherein the routing factor includes a component which depends upon the shortest possible number of hops in which the packet could reach its ultimate destination if it were routed via the respective node output, such that the fewer the number of hops, the more likely it is that the respective output node will be selected.

2. A method of routing a data packet at a network node, the method comprising:
   (a) determining valid node outputs to which the packet may be routed;
   (b) generating a routing factor for each of the valid node outputs to which the packet may be routed;
   (c) randomly selecting one of said valid node outputs,
   wherein the probability of selecting one of the valid node outputs is related to the respective routing factor for that node output;
   wherein the routing factor includes a component which depends upon the shortest possible number of hops in which the packet could reach its ultimate destination if it were routed via the respective node output, such that the fewer the number of hops, the more likely it is that the respective output node will be selected; and
   wherein the routing factor depends only upon information which is directly accessible to the network node at which the method is being performed or is directly accessible to a neighboring node, such that no information needs to be gathered from non-neighboring nodes.

3. A method of routing a data packet at a network node according to claim 2, wherein the routing factor additionally depends upon the time that the packet would be buffered in the respective output buffer.

4. A method of routing a data packet at a network node according to claim 2, wherein each respective node output is connected to a respective node input of a respective associated neighboring node, the respective node input having an associated input buffer, and wherein the routing factor additionally depends upon the time that the packet would be buffered in the respective input buffer of the connected input of the respective neighboring node of the respective node output.

5. A method of routing a data packet at a network node according to claim 2, wherein each respective node output is connected to a respective associated neighboring node, and wherein the routing factor additionally depends upon the packet transmission time to reach the respective neighboring node.

6. A program on a computer readable medium containing computer code which, when executed by a computer, performs the method of claim 2.

7. A network node which routes a data packet, said network node comprising:
   (a) means for determining valid node outputs to which the packet may be routed;
   (b) means for generating a routing factor for each of the valid node outputs to which the packet may be routed;
   (c) means for randomly selecting one of said valid node outputs,
   wherein the probability of selecting one of the valid node outputs is related to the respective routing factor for that node output;
   wherein the routing factor includes a component which depends upon the shortest possible number of hops in which the packet could reach its ultimate destination if it were routed via the respective node output, such that the fewer the number of hops, the more likely it is that the respective output node will be selected; and
   wherein the routing factor depends only upon information which is directly accessible to the network node or is directly accessible to a neighboring node, such that no information needs to be gathered from non-neighboring nodes.

8. A communications network comprising one or more network nodes according to claim 7.

9. A method of routing a data packet at a network node the method comprising:
   (a) determining valid node outputs to which the packet may be routed;
   (b) generating a routing factor for each of the valid node outputs to which the packet may be routed;
   (c) randomly selecting one of said valid node outputs,
   wherein the probability of selecting one of the valid node outputs is related to the respective routing factor for that node output;
   wherein the routing factor includes a component which depends upon the shortest possible number of hops in which the packet could reach its ultimate destination if it were routed via the respective node output, such that the fewer the number of hops, the more likely it is that the respective output node will be selected;
   wherein, each respective node output is connected to a respective node input of a respective associated neighboring node, the respective node input having an associated input buffer, and
   wherein the routing factor additionally depends upon one or more of the following additional factors:
   (a) the time that the packet would be buffered in a respective output buffer;
   (b) the time that the packet would be buffered in the respective input buffer of the connected input of the respective neighboring node of the respective node output; and
   (c) a packet transmission time to reach the respective neighboring node.

10. A method of routing a data packet at a network node, said method comprising:
    (a) determining valid node outputs to which the packet may be routed;
    (b) generating a routing factor for each of the valid node outputs to which the packet may be routed;
    (c) randomly selecting one of said valid node outputs,
    wherein the probability of selecting one of the valid node outputs is related to the respective routing factor for that node output;
    wherein the routing factor includes a component which depends upon the shortest possible number of hops in which the packet could reach its ultimate destination if it were routed via the respective node output, such that the fewer the number of hops, the more likely it is that the respective output node will be selected;

wherein each respective node output is connected to a respective node input of a respective associated neighboring node, the respective node input having an associated input buffer, and wherein the routing factor additionally depends upon one or more of the following additional factors:

(a) the time that the packet would be buffered in a respective output buffer;

(b) the time that the packet would be buffered in the respective input buffer of the connected input of the respective neighboring node of the respective node output; and (c) a packet transmission time to reach the respective neighboring node; and wherein the extent to which the routing factor depends on said shortest possible number of hops component relative to each additional factor depends upon a weighting constant, k, and wherein different values of k are used for respectively different packets depending upon a priority level assigned to the respective different packets.

11. A program on a computer readable medium containing computer code which, when executed by a computer, performs the method of claim 10.

12. A network node which routes a data packet, said node comprising:

(a) means for determining valid node outputs to which the packet may be routed;

(b) means for generating a routing factor for each of the valid node outputs to which the packet may be routed;

(c) means for randomly selecting one of said valid node outputs, wherein the probability of selecting one of the valid node outputs is related to the respective routing factor for that node output;

wherein the routing factor includes a component which depends upon the shortest possible number of hops in which the packet could reach its ultimate destination if it were routed via the respective node output, such that the fewer the number of hops, the more likely it is that the respective output node will be selected; and wherein the routing factor depends only upon information which is directly accessible to the network node or is directly accessible to a neighboring node, such that no information needs to be gathered from non-neighboring nodes;

wherein each respective node output is connected to a respective node input of a respective associated neighboring node, the respective node input having an associated input buffer, and wherein the routing factor additionally depends upon one or more of the following additional factors:

(a) the time that the packet would be buffered in a respective output buffer;

(b) the time that the packet would be buffered in the respective input buffer of the connected input of the respective neighboring node of the respective node output; and (c) a packet transmission time to reach the respective neighboring node; and wherein the extent to which the routing factor depends on said shortest possible number of hops component relative to each additional factor depends upon a weighting constant, k, and wherein different values of k are used for respectively different packets depending upon a priority level assigned to the respective different packets.

13. A communications network comprising one or more network nodes according to claim 12.

* * * * *